(12) United States Patent
LoRicco et al.

(10) Patent No.: US 11,248,481 B2
(45) Date of Patent: Feb. 15, 2022

(54) TURBINE VANE HAVING DUAL SOURCE COOLING

(71) Applicant: Raytheon Technologies Corporation, Farmington, CT (US)

(72) Inventors: Nicholas M. LoRicco, Agawam, MA (US); Efrain E. Vega, Manati, PR (US); Rafael A. Perez, Arecibo, PR (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/850,672

(22) Filed: Apr. 16, 2020

(65) Prior Publication Data

US 2021/0324753 A1    Oct. 21, 2021

(51) Int. Cl.
*F01D 9/06*    (2006.01)
*F01D 11/00*    (2006.01)
(Continued)

(52) U.S. Cl.
CPC .......... *F01D 11/005* (2013.01); *F01D 9/041* (2013.01); *F01D 9/06* (2013.01); *F01D 25/14* (2013.01); *F05D 2240/12* (2013.01); *F05D 2240/55* (2013.01); *F05D 2240/81* (2013.01); *F05D 2250/185* (2013.01); *F05D 2260/201* (2013.01); *F05D 2260/202* (2013.01)

(58) Field of Classification Search
CPC ..... F01D 9/02; F01D 9/04; F01D 9/06; F01D 11/005; F01D 25/14; F05D 2240/55; F05D 2240/81
See application file for complete search history.

(56) References Cited

U.S. PATENT DOCUMENTS 9,151,164 B2    10/2015  Tardif et al.
9,938,842 B2*   4/2018   Spangler .................. F01D 9/02
(Continued)

FOREIGN PATENT DOCUMENTS

EP    1384858 A2    1/2004
EP    3121382 A1    1/2017

OTHER PUBLICATIONS

European Search Report for European Application No. 21169003.7, dated Aug. 4, 2021, 9 pages.

*Primary Examiner* — Courtney D Heinle
*Assistant Examiner* — Danielle M. Christensen
(74) *Attorney, Agent, or Firm* — Cantor Colburn LLP (57) ABSTRACT

Vane assemblies for turbine engines are described. The vane assemblies include a vane having an internal cavity and a vane platform and a vane rail defining, in part, an outer diameter supply cavity. A blade outer air seal support (BOAS support) is arranged adjacent the vane and engages with a portion of the vane, the blade outer air seal support having BOAS support rail, and a BOAS supported on the BOAS support and engaging with a portion of the vane. The BOAS support includes a first cooling flow aperture configured to enable a cooling flow to cool at least the BOAS and a second cooling flow aperture formed in the BOAS support rail. The vane rail includes a third cooling flow aperture to form a cooling flow path through the second cooling flow aperture and the third cooling flow aperture to fluidly connect to the outer diameter supply cavity.

19 Claims, 5 Drawing Sheets

(51) Int. Cl.
*F01D 9/04* (2006.01)
*F01D 25/14* (2006.01)

(56) References Cited

U.S. PATENT DOCUMENTS

| | | | |
|---|---|---|---|
| 9,982,560 B2 | 5/2018 | Boeke et al. | |
| 9,988,834 B2 * | 6/2018 | Sofianek | E05D 13/1276 |
| 10,502,075 B2 | 12/2019 | Papple et al. | |
| 2003/0035722 A1 | 2/2003 | Barrett et al. | |
| 2004/0208744 A1 * | 10/2004 | Shi | F01D 9/041 |
| | | | 416/97 R |
| 2007/0189898 A1 * | 8/2007 | Hooper | F01D 5/187 |
| | | | 416/97 R |
| 2007/0231123 A1 | 10/2007 | Dervaux et al. | |
| 2012/0257954 A1 | 10/2012 | Chanteloup et al. | |

* cited by examiner

TURBINE VANE HAVING DUAL SOURCE COOLING

BACKGROUND

The subject matter disclosed herein generally relates to gas turbine engines and, more particularly, to cooling schemes for turbine vanes.

Gas turbine engines include various sections that are subject to high temperatures, and ensuring cooling thereof is a goal of gas turbine engine systems. Some components that may require cooling are airfoils, such as blades and vanes, particularly turbine vanes. High pressure turbine vanes are exposed to high temperatures during operation due to the location within a gas turbine engine (e.g., immediately downstream from a combustor). As such, cooling of such components is necessary to ensure efficient operation of the gas turbine engine and to eliminate risks such as part or material fatigue and/or part failure.

As such, the airfoils of gas turbine engines have internal cavities through which a cooling flow of air may be injected to provide internal cooling. Vanes may have both inner and outer diameter cooling, because the vanes are stationary and may be attached at both the inner and outer diameter. As operating temperatures are increased for gas turbine engines, cooling must in turn be increased and become more efficient and effective to accommodate such increased operating temperatures. Accordingly, improved cooling schemes for airfoils in gas turbine engines may be advantageous.

SUMMARY

According to some embodiments, vane assemblies of a gas turbine engines are provided. The vane assemblies include a vane defining at least one internal cavity, the vane having a vane platform and a vane rail defining, in part, an outer diameter supply cavity. A blade outer air seal support (BOAS support) is arranged adjacent the vane and engaging with a portion of the vane, the blade outer air seal support having BOAS support rail. A blade outer air seal (BOAS) is supported on the BOAS support and engaging with a portion of the vane. The BOAS support includes a first cooling flow aperture configured to enable a cooling flow to cool at least the BOAS and a second cooling flow aperture formed in the BOAS support rail. The vane rail includes a third cooling flow aperture such that a cooling flow path is formed through the second cooling flow aperture and the third cooling flow aperture to fluidly connect to the outer diameter supply cavity.

In addition to one or more of the features described above, or as an alternative, further embodiments of the vane assemblies may include that the at least one internal cavity is a serpentine cavity.

In addition to one or more of the features described above, or as an alternative, further embodiments of the vane assemblies may include that the at least one internal cavity is a leading edge cavity and a trailing edge cavity.

In addition to one or more of the features described above, or as an alternative, further embodiments of the vane assemblies may include that cooling air flowing through the cooling flow path is supplied to the trailing edge cavity.

In addition to one or more of the features described above, or as an alternative, further embodiments of the vane assemblies may include that a portion of the air supplied through the first cooling flow aperture is supplied to the leading edge cavity.

In addition to one or more of the features described above, or as an alternative, further embodiments of the vane assemblies may include a plug configured to prevent cooling flow from the outer diameter supply cavity to enter the leading edge cavity.

In addition to one or more of the features described above, or as an alternative, further embodiments of the vane assemblies may include that a passage connects the leading edge cavity to the trailing edge cavity, and wherein the leading edge cavity is configured to receive relatively high pressure air and the trailing edge cavity is configured to receive relatively low pressure air.

In addition to one or more of the features described above, or as an alternative, further embodiments of the vane assemblies may include that the passage is one or machined or cast-in to the vane assembly between the leading edge cavity and the trailing edge cavity.

According to some embodiments, gas turbine engines are provided. The gas turbine engines include a compressor section, a turbine section having at least one vane assembly, and a turbine cooling air (TCA) conduit fluidly connecting the compressor section to the turbine section. The at least one vane assembly include a vane defining at least one internal cavity, the vane having a vane platform and a vane rail and defining, in part, an outer diameter supply cavity, a blade outer air seal support (BOAS support) arranged adjacent the vane and engaging with a portion of the vane, the blade outer air seal support having BOAS support rail, and a blade outer air seal (BOAS) supported on the BOAS support and engaging with a portion of the vane. The BOAS support includes a first cooling flow aperture configured to enable a cooling flow to cool at least the BOAS. The BOAS support includes a second cooling flow aperture formed in the BOAS support rail. The vane rail includes a third cooling flow aperture such that a cooling flow path is formed through the second cooling flow aperture and the third cooling flow aperture to fluidly connect to the outer diameter supply cavity.

In addition to one or more of the features described above, or as an alternative, further embodiments of the gas turbine engines may include that the at least one internal cavity is a serpentine cavity.

In addition to one or more of the features described above, or as an alternative, further embodiments of the gas turbine engines may include that the at least one internal cavity is a leading edge cavity and a trailing edge cavity.

In addition to one or more of the features described above, or as an alternative, further embodiments of the gas turbine engines may include that cooling air flowing through the cooling flow path is supplied to the trailing edge cavity.

In addition to one or more of the features described above, or as an alternative, further embodiments of the gas turbine engines may include that a portion of the air supplied through the first cooling flow aperture is supplied to the leading edge cavity.

In addition to one or more of the features described above, or as an alternative, further embodiments of the gas turbine engines may include a plug configured to prevent cooling flow from the outer diameter supply cavity to enter the leading edge cavity.

In addition to one or more of the features described above, or as an alternative, further embodiments of the gas turbine engines may include that a passage connects the leading edge cavity to the trailing edge cavity, and wherein the leading edge cavity is configured to receive relatively high pressure air and the trailing edge cavity is configured to receive relatively low pressure air.

In addition to one or more of the features described above, or as an alternative, further embodiments of the gas turbine engines may include that the passage is one or machined or cast-in to the vane assembly between the leading edge cavity and the trailing edge cavity.

In addition to one or more of the features described above, or as an alternative, further embodiments of the gas turbine engines may include an engine case, wherein each of the vane rail and the BOAS support rail are configured to engage with the engine case.

In addition to one or more of the features described above, or as an alternative, further embodiments of the gas turbine engines may include that a cooling flow through the cooling flow path has a higher pressure than a cooling flow through the TCA conduit.

In addition to one or more of the features described above, or as an alternative, further embodiments of the gas turbine engines may include that the vane is a second stage vane of the gas turbine engine.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
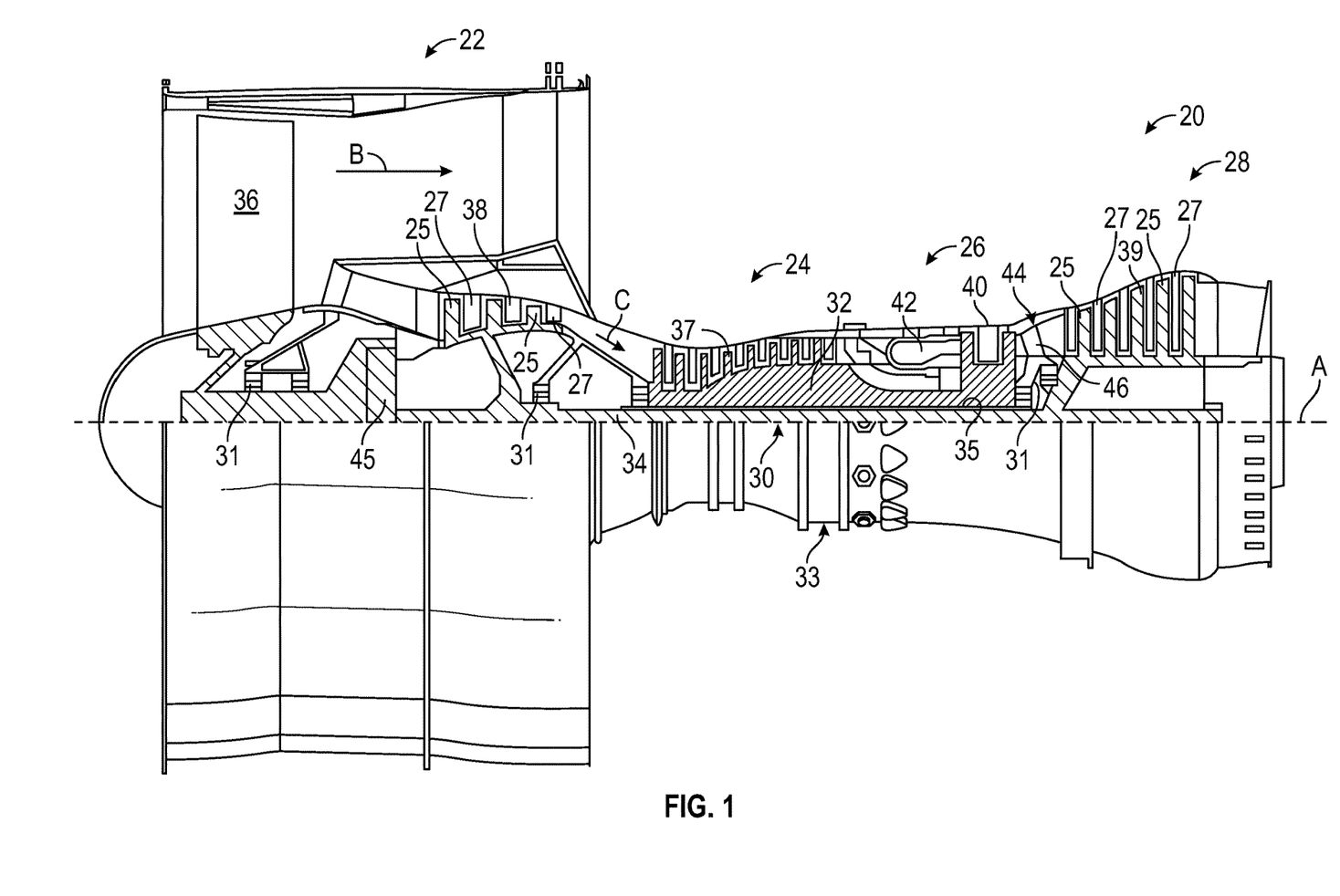
FIG. 1 is a schematic cross-sectional illustration of a gas turbine engine architecture that may employ various embodiments disclosed herein.

FIG. 1 schematically illustrates a gas turbine engine 20. The exemplary gas turbine engine 20 is a two-spool turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies add or extract energy from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Although a specific architecture for a gas turbine engine is depicted in the disclosed non-limiting example embodiment, it should be understood that the concepts described herein are not limited to use with the shown and described configuration, as the teachings may be applied to other types of engines such as, but not limited to, turbojets, turboshafts, and other turbofan configurations (e.g., wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT")).

Figure 2:
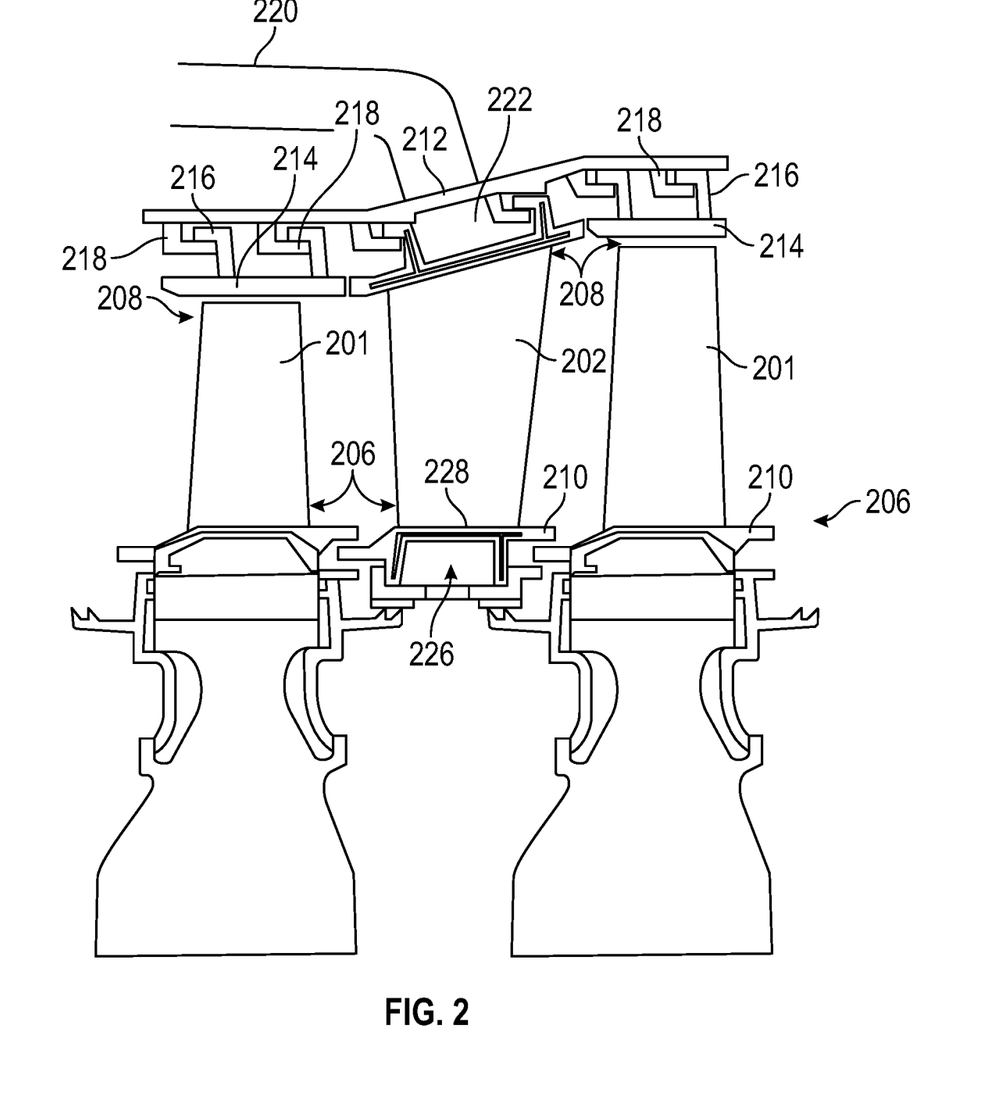
FIG. 2 is a schematic illustration of a section of a gas turbine engine that may employ various embodiments disclosed herein.

FIG. 2 is a schematic view of a turbine section that may employ various embodiments disclosed herein. Turbine 200 includes a plurality of airfoils, including, for example, one or more blades 201 and vanes 202. The airfoils 201, 202 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions within the airfoils 201, 202 that may extend either from the inner diameter 206 or the outer diameter 208 of the airfoil 201, 202. The partitions may extend for a portion of the length of the airfoil 201, 202, but may stop or end prior to forming a complete wall within the airfoil 201, 202. Thus, each of the airfoil cavities may be fluidly connected and form a fluid path within the respective airfoil 201, 202. The blades 201 and the vanes 202 may include platforms 210 located proximal to the inner diameter thereof. Located below the platforms 210 may be airflow ports and/or bleed orifices that enable air to bleed from the internal cavities of the airfoils 201, 202. A root of the airfoil may connected to or be part of the platform 210.

The turbine 200 is housed within a case 212, which may have multiple parts (e.g., turbine case, diffuser case, etc.). In various locations, components, such as seals, may be positioned between airfoils 201, 202 and the case 212. For example, as shown in FIG. 2, blade outer air seals 214 (hereafter "BOAS") are located radially outward from the blades 201. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 218 that engage with the hooks 216 to secure the BOAS 214 between the case 212 and a tip of the blade 201.

A turbine cooling air (TCA) conduit 220 provides cooling air into an outer diameter supply cavity 222 defined in part by an outer platform 224 and the case 212. The vane 202 may have interior hollow spaces/cavities so that cooling air can travel radially into and downstream from the outer diameter supply cavity 222, through the vane 202 through one or more airfoil cavities, and into a vane inner diameter cavity 226. The vane inner diameter cavity 226 is defined, in part, by an inner platform 228. Thereafter, the cooling air may be directed to provide rotor cooling radially inward from the vane 202. Accordingly, cooling air for at least portions of the vane 202 will flow from a platform region, into and through the vane 202, and then out of the vane 202 and into another platform region and/or into a hot gaspath/main gaspath. The air sourced into the turbine cooling air conduit 220 may be provided from an upstream location along the gas turbine engine, such as from the compressor section.

Typically, high pressure turbine vanes require cooling flow bled off of the compressor section in order to meet life targets. For example, the high pressure turbine vanes are exposed to gaspath air temperatures that may exceed the capability of the constituent alloys and coatings of the vanes that are located and exposed in the gaspath. In order to minimize cycle losses due to cooling flow (and improve turbine efficiency), it is advantageous to use as little cooling air as possible to meet lifing targets. Additionally, it is beneficial to use cooling air bled off of lower compressor stages, whenever possible, as the cycle penalty is lower when utilizing this air for cooling. It is fairly common for turbine vanes to have multiple cooling sources for this reason.

A leading edge of the vanes will typically experience higher gaspath pressures, and often requires higher pressure cooling air (and more 'expensive' air from an efficiency standpoint) to maintain outflow and cool the exterior surface. As such, the air needed to cool the leading edge of the vanes may be needed to be sourced from a high stage portion of the compressor section. However, toward the trailing edge of the vanes, the gaspath pressures are lower and cooling can be provided from a lower stage in the compressor as compared to the leading edge. This pressure differential between the leading edge cooling requirements and the trailing edge cooling requirements can make the cooling scheme more complicated. However, by providing such bifurcated pressures for cooling air to the vane, efficiency may be improved. Due to air system limitations, there may be a fixed amount of air that can be supplied from a single cooling air bleed source off of the compressor. In order to meet cooling requirements and program life targets, improved cooling schemes are described herein.

Embodiments of the present disclosure are directed to increasing the amount of cooling air flow supplied to a cavity of vane (e.g., high pressure turbine vane) by adding cooling flow from a higher pressure source than previously employed. That is, a supplemental high pressure source of cooling flow is arranged to provide a high pressure cooling air to a portion of the vane (e.g., leading edge cavity). Such high pressure air is considered "expensive" because high pressure air has had more work applied thereto from the compressor section. As this is 'more expensive' air (i.e., the more work has been done on the air by the compressor, and results in a higher efficiency debit when used as cooling) this flow is limited in the amount that is supplied to the vane. For example, a cooling supply hole may be formed to meter the cooling flow.

In another embodiment, one skilled in the art may recognize that external pressures may exceed the internal cooling air pressure in passages supplied from the lower pressure source. Thus, cooling holes cannot be manufactured in such locations due to the negative outflow margin, and only internal convective cooling can be used to reduce wall temperatures. By using the aforementioned cooling configuration to augment the amount of flow available to the lower pressure cooling passage, the internal pressure of the cooling passage is also increased. This pressure increase can enable positive out flow margin in the internal passage and thus the incorporation of film cooling holes to further reduce wall temperatures. Without such pressure augmentation, the fluidic connection of film holes between internal and external surfaces would lead to ingestion of gaspath air into the vane cooling passages.

One such location of a cooling supply hole may be in a support ring for a blade outer air seal ("BOAS") of a blade assembly that is located forward from the vane to be cooled. The cooling supply holes formed in the BOAS support may be configured to control the amount of cooling flow that can pass therethrough. For example, in one non-limiting example, a size of a cooling supply hole communicating through a BOAS support and vane rail may be selected to ensure metered flow therethrough. In this situation, the air system is limited in how much air can be pulled from a mid-compressor stage, and needs to resort to more expensive air from an additional cooling source to augment the existing flow. This flow reaches the vane by the cooling supply hole formed in the BOAS support as well as the vane rail.

Figure 3A:
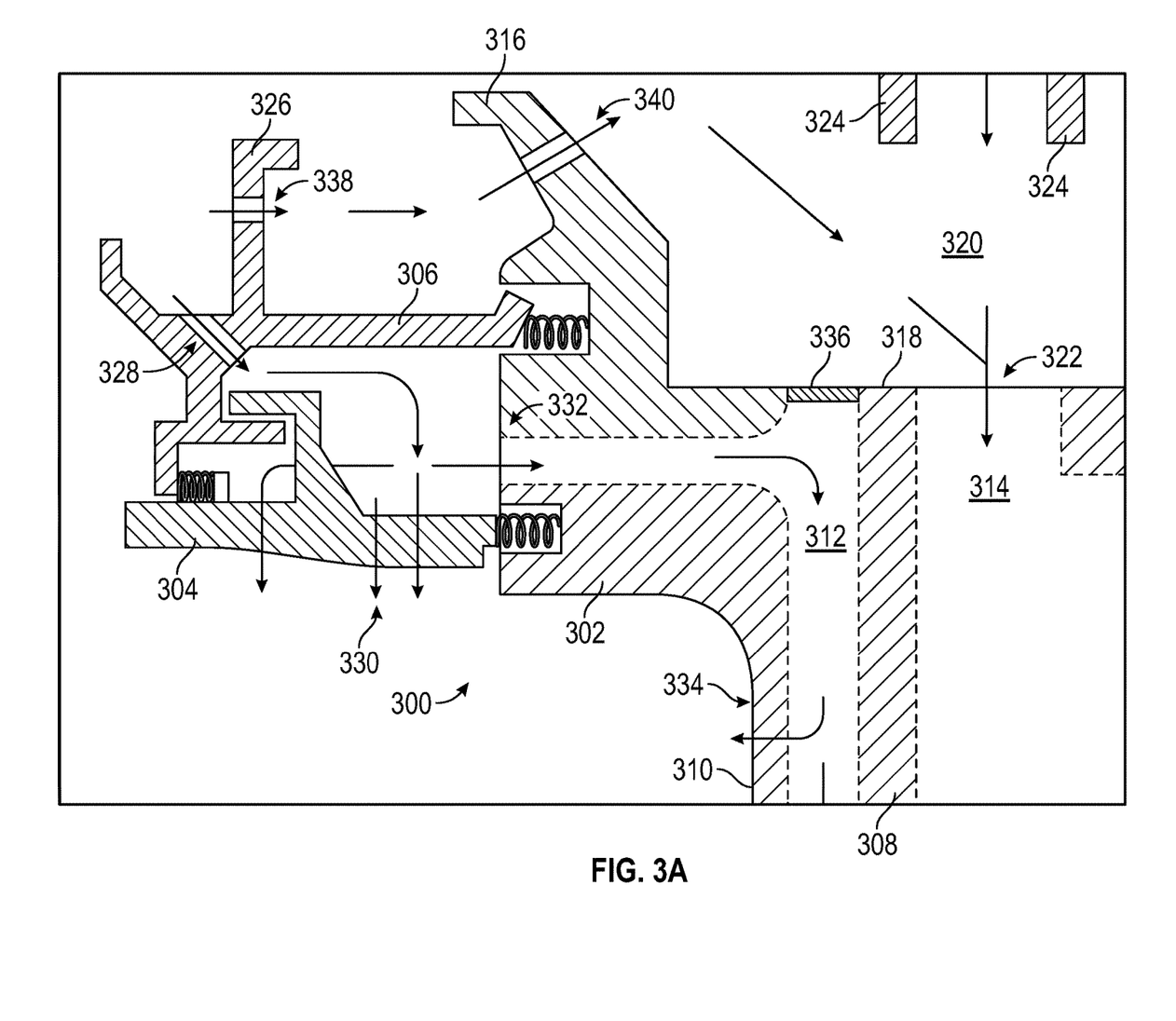
FIG. 3A is a schematic illustration of a vane assembly in accordance with an embodiment of the present disclosure.
Figure 3B:
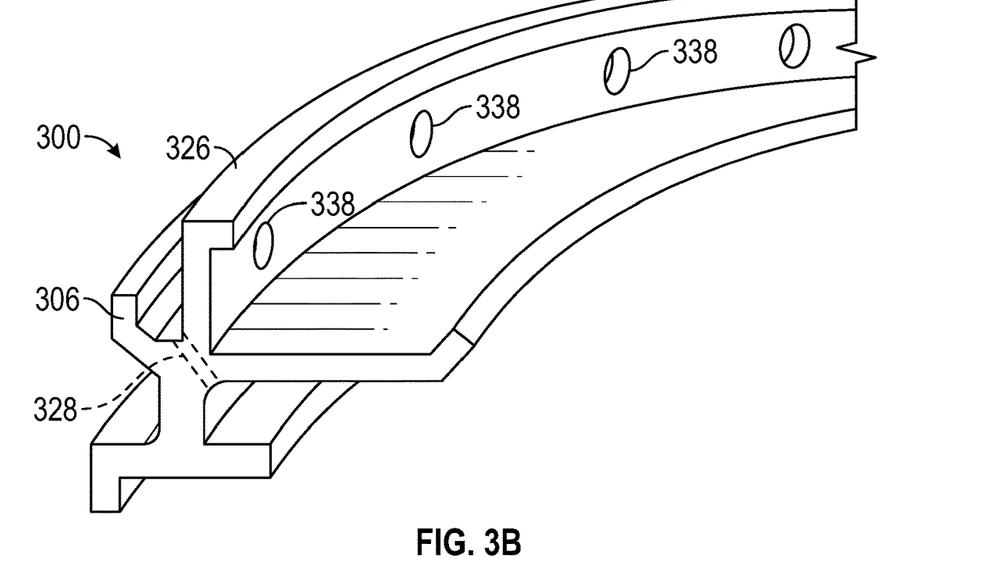
FIG. 3B is an isometric illustration of a portion of the vane assembly of FIG. 3A.
Figure 3C:
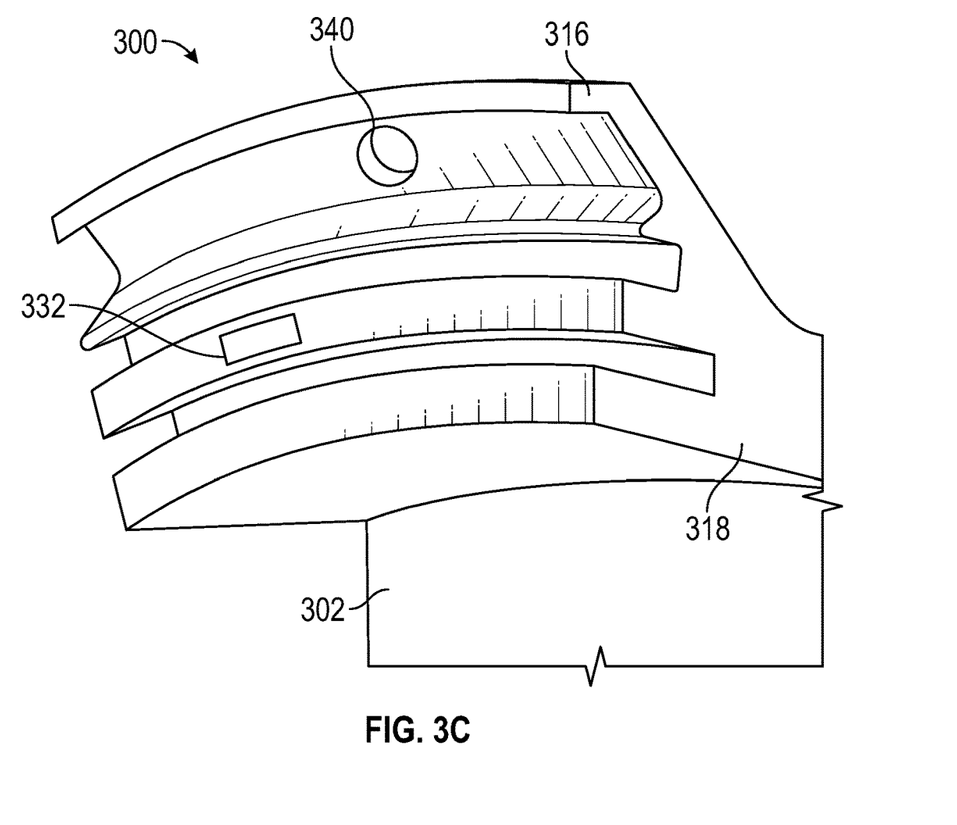
FIG. 3C is an isometric illustration of a portion of the vane assembly of FIG. 3A.

Turning now to FIGS. 3A-3C, schematic illustrations of a vane assembly 300 in accordance with an embodiment of the present disclosure is shown. FIG. 3A is a side cross-sectional view illustrating the vane assembly 300 having a vane 302, a blade outer air seal (BOAS) 304 arranged forward of the vane 302, and a BOAS support 306 configured to retain the BOAS 304 to an engine case or other structure (not shown). FIG. 3B is a partial isometric view (looking in the forward direction) of the BOAS support 306. FIG. 3C is a partial isometric view (looking in the aft direction) of the vane 302 and associated structure.

The vane assembly 300 may be used in a gas turbine engine, and may be arranged as a portion of a high pressure turbine thereof. As shown, the BOAS 304 and the BOAS support 306 may engage with the vane 302. In one non-limiting example, the vane 302 may be a vane in a second stage vane, and the BOAS 304 may be a first stage BOAS. In such configuration, forward or upstream from the BOAS 304 may be a first stage vane that is immediately downstream of a combustor of the gas turbine engine.

The vane 302 includes an airfoil body 308 that defines a leading edge 310 that is exposed to hot gases within a gas path of the gas turbine engine. Within the airfoil body 308 are defined, at least, a leading edge cavity 312 and a trailing edge cavity 314. The vane 302 also includes a vane rail 316 that is configured to engage with and secure the vane 302 to an engine case or other structure. A vane platform 318 is not exposed to the gas path and defines, in part, an outer diameter supply cavity 320. The outer diameter supply cavity 320 is arranged to supply cooling air into, at least, the trailing edge cavity 314 through an opening 322 in the vane platform 318. The cooling air may be sourced from, at least in part, a turbine cooling air (TCA) conduit 324.

The BOAS 304 attaches to the BOAS support 306, which in turn attaches to an engine case by a BOAS support rail 326. Cooling air may be supplied to the BOAS 304 from an upstream location, such as a diffuser or forward located vane (e.g., first vane stage). This cooling air is a relatively high pressure cooling flow that is used not only to cool the BOAS 304 but also to provide cooling to the vane 302 and specifically the leading edge 310 of the vane 302. The high pressure cooling air passes through the structure of the BOAS support 306 through a first cooling flow aperture 328. The cooling flow through the first cooling flow aperture 328 will provide cooling to the BOAS 304, including impingement or film cooling 330, along with cooling to the leading edge 310 of the vane 302. The high pressure cooling flow from the first cooling flow aperture 328 will enter the vane 302 through a leading edge cooling inlet 332, and the cooling flow will enter the leading edge cavity 312, and may flow therethrough and/or impinge or generate film cooling through one or more leading edge film cooling holes 334.

Accordingly, the leading edge cavity 312 may be sourced with cooling air that is at a higher pressure than the air from the TCA conduit 324. Mixing of the high pressure air from the first cooling flow aperture 328 with lower pressure air from the TCA conduit 324 is blocked by a plug weld 336 that is installed in a leading edge opening in the vane platform 318. The plug weld 336 is configured to fill an opening that is formed during the manufacturing process and prevents a potentially undesirable communication in airflow between cooling passages. In other embodiments, the passage opening of the leading edge cavity 312 may be sealed with a cover plate or insert, as will be appreciated by those of skill in the art. If the manufacturing process does not generate such opening to the leading edge cavity 312, the plug weld or other structures/components/features may be omitted.

To provide additional cooling air to the trailing edge cavity 314, the vane assembly 300 is configured to enable a portion of the higher pressure cooling flow to mix with the relatively lower pressure cooling from the TCA conduit 324, with such mixing occurring within the outer diameter supply cavity 320. To enable this, the BOAS support 306 includes a second cooling flow aperture 338 which is formed in the BOAS support rail 326 and a third cooling flow aperture 340 is formed in the vane rail 316. The second cooling flow apertures 338 are shown in FIG. 3B, and the third cooling flow aperture 340 is shown in FIG. 3C. As such, a fluid path from the BOAS support 306 (or locations upstream therefrom) to the outer diameter supply cavity 320 is provided. Also shown in FIGS. 3B-3C are the fluid apertures of the first cooling flow aperture 328 and the leading edge cooling inlet 332.

The inclusion of the second and third cooling flow apertures 338, 340 permits additional cooling air to flow to the trailing edge cavity 314 that otherwise could not be provided by the secondary air flow system as designed. The added cooling air may cool the internal passages of the vane by traversing cooling features such as turbulators, pedestals, or other thermal transfer augmentation features, as will be appreciated by those of skill in the art. Furthermore, the cooling flow may provide cooling by exiting the vane through film holes or trailing edge slots, as will be appreciated by those of skill in the art.

Although shown in FIG. 3 with the vane 302 having distinct leading and trailing edge cavities, such configuration is not to be limiting. For example, embodiments of the present disclosure may be applied to vanes having only one cooling circuit, such as a serpentine. When supplying a vane with mid-compressor bleed air for cooling, it is possible that there is insufficient out flow margin, particularly at the leading edge. This resupply feature provides air through the BOAS support 306 and vane rail 316 which augment the internal vane pressure to ensure there is adequate out flow margin should the vane burn or crack during operation. The size of the apertures 338, 340 can be sized to limit a resulting reduction in efficiency due to extracting higher pressure air that previously was not employed as described herein.

In some embodiments of the present disclosure, higher pressure air can be supplied to the outer diameter supply cavity 320 by an alternate route. Further, in some embodiments, the plug weld 336 can be omitted to allow direct communication between the outer diameter supply cavity 320 and the leading edge cavity 312. Furthermore, in some embodiments, the plug weld 336 (or other plug/cover) can have a cooling flow aperture machined therethrough to provide a desired amount of supplemental flow from the outer diameter supply cavity 320 to the leading edge cavity 312.

In another embodiment, a cooling flow aperture could be machined or cast in place, connecting the leading edge passage 312 directly to the trailing edge cavity 314. Such cross-over aperture can enable augmentation of cooling air within the trailing edge cavity 314 with a mixture of higher pressure cooling air from the leading edge cavity 312. Or, if the air supplied to the trailing edge cavity 314 is of higher pressure than within the leading edge cavity 312, the cooling air within the trailing edge cavity 314 may provide for, for example, an impingement type cooling into the leading edge cavity 312. The cooling flow apertures may be sized to limit the amount of communication so as to incur the smallest necessary debit to cycle efficiency while maintaining the required cooling air.

Figure 4:
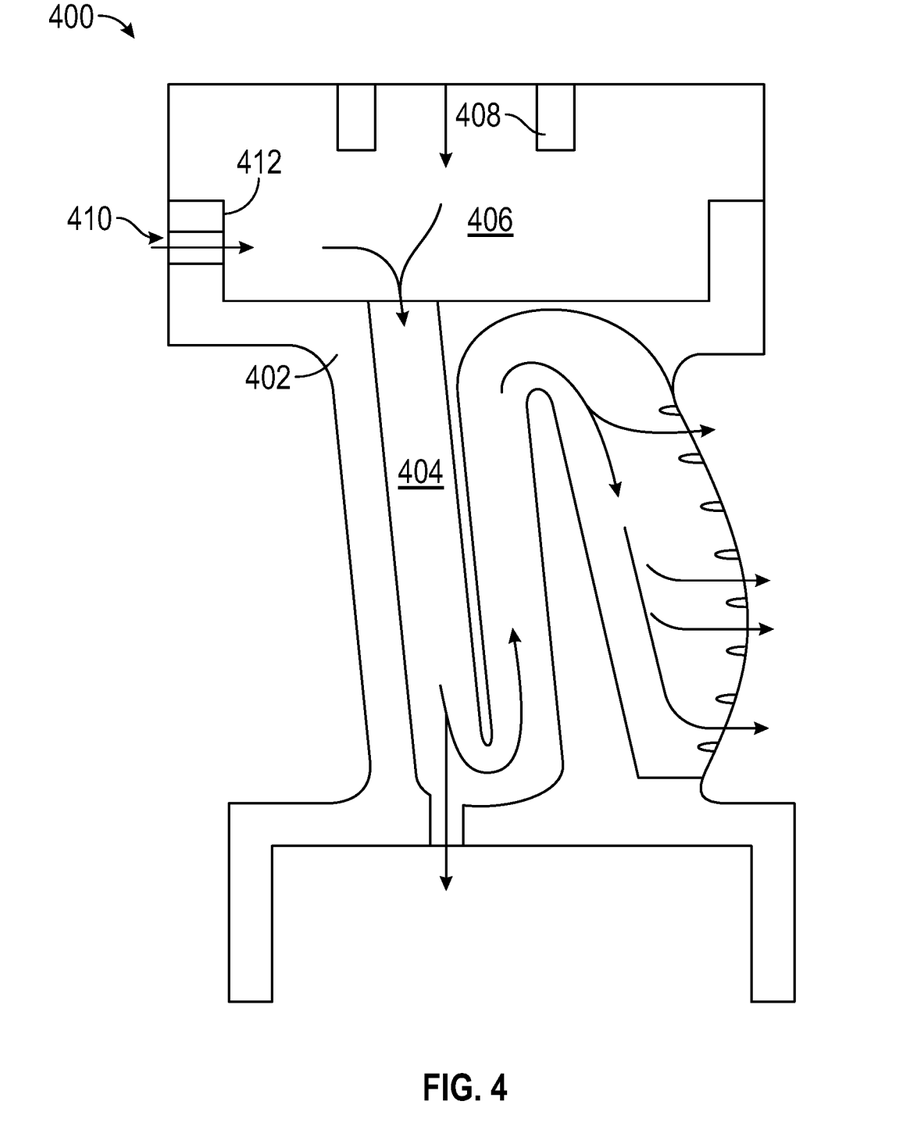
FIG. 4 is a schematic illustration of a vane that can be employed with embodiments of the present disclosure.

Turning now to FIG. 4, a schematic illustration of a vane assembly 400 in accordance with an embodiment of the present disclosure is shown. The vane assembly 400 includes a vane 402 which may be substantially arranged as shown and described above. For example, forward of the vane 402 may be a BOAS and BOAS support, similar to that shown and described above. The primary distinction of this embodiment is that the vane 402 includes a single internal cavity 404, which is shown as a serpentine cavity. In a single cavity configuration, the cooling air for the entire vane 402 is sourced from an outer diameter supply cavity 406.

The outer diameter supply cavity 406 receives relatively low pressure air from a TCA conduit 408. However, the relatively low pressure air from the TCA conduit 408 is increased by mixing with a higher air supply provided through a cooling flow aperture 410 that is formed in a vane rail 412 of the vane assembly 400. The high pressure cooling air may be sourced through a respective cooling flow aperture formed in a BOAS support rail, as shown and described above. It will be noted that in the single internal cavity configuration, the first cooling flow aperture (formed in the BOAS support) may be used to cool only the BOAS and may not fluidly connect to the internal cavity of the vane 402.

In accordance with embodiments of the present disclosure, the high-pressure cooling source supplying air to the vane leading edge is approximately 30-40% higher, or greater, than that of the low pressure source supplying air to the vane trailing edge. One will note that for a given engine configuration this ratio will change with operating conditions as well as deterioration. Other applications may have entirely different ratios between high and low pressure sources, depending on performance, durability, and configuration requirements.

Advantageously, embodiments described herein provide for improved cooling of vane in gas turbine engines. The vane assemblies of the present disclosure enable improved pressure control for cooling air supplied to cool internal cavities of airfoils, and specifically vanes.

As used herein, the terms "about" and "substantially" are intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A vane assembly of a gas turbine engine comprising:
a vane defining at least one internal cavity including a leading edge cavity, the vane having a vane platform and a vane rail defining, in part, an outer diameter supply cavity, wherein a leading edge cooling inlet is formed in a forward edge of the vane platform and fluidly connected to the leading edge cavity;
a blade outer air seal support (BOAS support) arranged adjacent the vane and engaging with a portion of the vane, the blade outer air seal support having a BOAS support rail configured to attach to an engine case of the gas turbine engine; and
a blade outer air seal (BOAS) supported on the BOAS support and engaging with a portion of the vane,
wherein:
the BOAS support includes a first cooling flow aperture configured to enable a cooling flow to cool at least the BOAS and the leading edge cavity through the leading edge cooling inlet along a first cooling flow path,
the BOAS support includes a second cooling flow aperture formed in the BOAS support rail, and
the vane rail includes a third cooling flow aperture such that a second cooling flow path is formed through the second cooling flow aperture and the third cooling flow aperture to fluidly connect to the outer diameter supply cavity, wherein a portion of the BOAS support separates the first cooling flow path from the second cooling flow path.

2. The vane assembly of claim 1, wherein the at least one internal cavity further includes a serpentine cavity.

3. The vane assembly of claim 1, wherein the at least one internal cavity further includes a trailing edge cavity arranged aft of the leading edge cavity.

4. The vane assembly of claim 3, wherein cooling air flowing through the second cooling flow path is supplied to the trailing edge cavity.

5. The vane assembly of claim 3, wherein a passage connects the leading edge cavity to the trailing edge cavity, and wherein the leading edge cavity is configured to receive cooling air at a first pressure and the trailing edge cavity is configured to receive cooling air at a second pressure, wherein the first pressure is higher than the second pressure.

6. The vane assembly of claim 5, wherein the passage is one of machined or cast-in to the vane assembly between the leading edge cavity and the trailing edge cavity.

7. The vane assembly of claim 1, further comprising a plug configured to prevent cooling flow from the outer diameter supply cavity to enter the leading edge cavity, wherein the plug is installed to fill an opening in the platform.

8. The vane assembly of claim 1, further comprising a plug installed to fill an opening in the platform, the plug including at least one cooling flow aperture configured to allow cooling air from the outer diameter supply cavity to enter the leading edge cavity.

9. A gas turbine engine comprising:
a compressor section;
a turbine section having at least one vane assembly; and
a turbine cooling air (TCA) conduit fluidly connecting the compressor section to the turbine section,
wherein the at least one vane assembly comprises:
a vane defining at least one internal cavity including a leading edge cavity, the vane having a vane platform and a vane rail defining, in part, an outer diameter supply cavity, wherein a leading edge cooling inlet is formed in a forward edge of the vane platform and fluidly connected to the leading edge cavity;
a blade outer air seal support (BOAS support) arranged adjacent the vane and engaging with a portion of the vane, the blade outer air seal support having a BOAS support rail configured to attach to an engine case of the gas turbine engine; and
a blade outer air seal (BOAS) supported on the BOAS support and engaging with a portion of the vane, and wherein:
the BOAS support includes a first cooling flow aperture configured to enable a cooling flow to cool at least the BOAS and the leading edge cavity through the leading edge cooling inlet along a first cooling flow path,
the BOAS support includes a second cooling flow aperture formed in the BOAS support rail, and
the vane rail includes a third cooling flow aperture such that a second cooling flow path is formed through the second cooling flow aperture and the third cooling flow aperture to fluidly connect to the outer diameter supply cavity.

10. The gas turbine engine of claim 9, wherein the at least one internal cavity further includes a serpentine cavity.

11. The gas turbine engine of claim 9, wherein the at least one internal cavity further includes a trailing edge cavity arranged aft of the leading edge cavity.

12. The gas turbine engine of claim 11, wherein cooling air flowing through the second cooling flow path is supplied to the trailing edge cavity.

13. The gas turbine engine of claim 9, further comprising a plug configured to prevent cooling flow from the outer diameter supply cavity to enter the leading edge cavity, wherein the plug is installed to fill an opening in the platform.

14. The gas turbine engine of claim 11, wherein a passage connects the leading edge cavity to the trailing edge cavity, and wherein the leading edge cavity is configured to receive cooling air at a first pressure and the trailing edge cavity is configured to receive cooling air at a second pressure, wherein the first pressure is higher than the second pressure.

15. The gas turbine engine of claim 14, wherein the passage is one of machined or cast-in to the vane assembly between the leading edge cavity and the trailing edge cavity.

16. The gas turbine engine of claim 9, further comprising an engine case, wherein each of the vane rail and the BOAS support rail are configured to engage with the engine case.

17. The gas turbine engine of claim 9, wherein a cooling flow through the cooling flow path has a higher pressure than a cooling flow through the TCA conduit.

18. The gas turbine engine of claim 9, wherein the vane is a second stage vane of the gas turbine engine.

19. The gas turbine engine of claim 9, further comprising a plug installed to fill an opening in the platform, the plug including at least one cooling flow aperture configured to allow cooling air from the outer diameter supply cavity to enter the leading edge cavity.

* * * * *